Patented Aug. 6, 1940

2,210,320

UNITED STATES PATENT OFFICE 2,210,320

MANUFACTURE OF METHACRYLONITRILE

Carl T. Kautter, Darmstadt, and Albert Robert Heinz Gräfe, Frankfort-on-the-Main, Germany, assignors to Röhm & Haas Company, Philadelphia, Pa.

No Drawing. Application December 29, 1938, Serial No. 248,212. In Germany December 30, 1937

4 Claims. (Cl. 260—464)

This invention relates to a process for the production of methylacrylonitrile. It relates particularly to a process of dehydrating acetone cyanohydrine by means of halides or oxyhalides of phosphorus or sulfur according to which there is a simultaneous production of methacrylonitrile and α-halo isobutyronitrile.

It is known that phosphorus pentoxide will dehydrate acetone cyanhydrine to form methacrylonitrile but this method has several disadvantages, particularly in large scale operations. In the first place phosphorus pentoxide is a very hygroscopic material and difficult to handle in the factory. In the second place the yields of methacrylonitrile are very low so that the process is not an economical one.

It is an object of this invention to provide a method for preparing methacrylonitrile in good yield along with some α-halo isobutyronitrile which can subsequently be converted to the methacrylonitrile if desired. It is a further object to carry out the reaction between acetone cyanohydrine and the halide or oxyhalide of phosphorous or sulfur under such conditions as to repress the formation of the halogenated nitrile.

These objects are accomplished by treating the acetone cyanohydrine with phosphorus pentachloride, phosphorus oxychloride or thionyl chloride at an elevated temperature. The preferred compound is thionyl chloride because when this reacts with water all the products are gaseous and can be readily removed from the reaction mixture. The phosphorus compounds also give good results but are somewhat more difficult to handle on account of the necessity of separating the phosphoric acid formed from the desired products.

In carrying out this process there is always some α-chloroisobutyronitrile formed but it has been found that by operating at temperatures of 75 to 100° and distilling out the product as it is formed, the amount of the α-chloroisobutyronitrile in the product can be considerably reduced. It has also been found that the amount of the chlorinated nitrile can be reduced by adding the phosphorus or sulfur halide to the acetone cyanohydrine at about the same rate as that at which it is consumed at the above mentioned temperature. The methacrylonitrile distills about as fast as it is formed and can then be purified or subjected to further treatment. The formation of the α-chloroisobutyronitrile can be still further repressed by adding a base to the acetone cyanohydrine to absorb the hydrogen chloride which is evolved.

The invention may be illustrated by the following examples but it is not limited to the relative amounts of reagents, time of heating or temperature, as it may otherwise be practiced within the scope of the appended claims.

Example 1.—173 grams of 98% pure acetone cyanohydrine is mixed with 250 grams of thionyl chloride and heated. The reaction begins at about 65° C. and the mass is heated for seven hours on a water bath under a reflux condenser. The product obtained after cooling is washed with water and soda solution and fractionally distilled. The yield is about 40% of methacrylonitrile and 40% of α-chloroisobutyronitrile.

Example 2.—85 grams of 97.5% pure acetone cyanohydrine is heated on a water bath to about 85° C. 119 grams of thionyl chloride is dropped in in the course of an hour. During this time the temperature rises to about 96° and a pale yellow liquid distills over. After all of the thionyl chloride has been added the temperature is raised to about 150° whereupon more liquid distills over. The distillate is then washed with water and soda solution and fractionated. The yield is about 50% of methacrylonitrile and 35% of α-chloroisobutyronitrile.

The α-chloroisobutyronitrile can be converted into valuable compounds according to known methods, for example, to α-chloroisobutyric acid esters or, by splitting out hydrogen chloride, to methacrylonitrile.

We claim:
1. The process of simultaneously producing methacrylonitrile and α-chloroisobutyronitrile which comprises treating acetone cyanohydrine with thionyl chloride.

2. The process of simultaneously producing methacrylonitrile and α-chloroisobutyronitrile which comprises treating acetone cyanohydrine with thionyl chloride at temperatures of about 75 to about 100° C.

3. The process of simultaneously producing methacrylonitrile and α-chloroisobutyronitrile which comprises treating acetone cyanohydrine with thionyl chloride at temperatures of about 75 to about 100° C. and distilling the methacrylonitrile as it is formed.

4. The process which comprises heating acetone cyanohydrine to about 85° C. adding thionyl chloride thereto at about the rate at which it is consumed and distilling out methacrylonitrile as it is formed.

CARL T. KAUTTER.
A. R. HEINZ GRÄFE.